US012098087B2

(12) United States Patent
Lee et al.

(10) Patent No.: US 12,098,087 B2
(45) Date of Patent: Sep. 24, 2024

(54) METHOD AND DEVICE FOR CUTTING STRUCTURE COMPOSED OF BRITTLE MATERIAL

(71) Applicant: MEERE COMPANY INC., Hwaseong-si (KR)

(72) Inventors: Joon Jung Lee, Anyang-si (KR); Jae Woong Won, Pyeongtaek-si (KR); Dae Sung Park, Osan-si (KR)

(73) Assignee: Meere Company Inc., Hwaseong-si (KR)

( * ) Notice: Subject to any disclaimer, the term of this patent is extended or adjusted under 35 U.S.C. 154(b) by 743 days.

(21) Appl. No.: 17/269,758

(22) PCT Filed: Dec. 11, 2019

(86) PCT No.: PCT/KR2019/017425
§ 371 (c)(1),
(2) Date: Feb. 19, 2021

(87) PCT Pub. No.: WO2020/122570
PCT Pub. Date: Jun. 18, 2020

(65) Prior Publication Data
US 2021/0317030 A1 Oct. 14, 2021

(30) Foreign Application Priority Data
Dec. 13, 2018 (KR) .................. 10-2018-0161181

(51) Int. Cl.
*C03B 33/033* (2006.01)
*B23K 26/53* (2014.01)
(Continued)

(52) U.S. Cl.
CPC ............ *C03B 33/033* (2013.01); *B23K 26/53* (2015.10); *B26D 7/086* (2013.01); *C03B 33/082* (2013.01);
(Continued)

(58) Field of Classification Search
None
See application file for complete search history.

(56) References Cited

U.S. PATENT DOCUMENTS 3,549,733 A * 12/1970 Caddell ............... B23K 26/066
264/293
2002/0006765 A1 1/2002 Michel et al.
(Continued)

FOREIGN PATENT DOCUMENTS

CN      107406297 A     11/2017
CN      107735373 A      2/2018
(Continued)

OTHER PUBLICATIONS

Machine translation of JP-10291084-A, Oct. 2023 (Year: 2023).*
(Continued)

*Primary Examiner* — Geoffrey S Evans
(74) *Attorney, Agent, or Firm* — Knobbe, Martens, Olson & Bear, LLP

(57) ABSTRACT

This application relates to a method and system for cutting a brittle body. In one aspect, the method includes preparing a brittle body having a rotary shaft. The method may also include forming a scribing line by irradiating laser on the brittle body along a preset route by using a laser irradiation unit. The method may further include cutting the brittle body by bringing a vibration unit that vibrates at a preset frequency in contact with a first region of the brittle body, which is spaced apart from the scribing line.

14 Claims, 9 Drawing Sheets

(51) Int. Cl.
   *B26D 7/08* (2006.01)
   *C03B 33/08* (2006.01)
   *C03B 33/09* (2006.01)
   *B23K 103/00* (2006.01)

(52) U.S. Cl.
   CPC ........ *C03B 33/091* (2013.01); *B23K 2103/54* (2018.08)

(56) References Cited

U.S. PATENT DOCUMENTS

| | | | |
|---|---|---|---|
| 2003/0109148 A1* | 6/2003 | Foad | H01L 21/02686 257/E21.562 |
| 2014/0027951 A1* | 1/2014 | Srinivas | B23K 26/009 264/400 |
| 2015/0034613 A1 | 2/2015 | Hosseini | |
| 2015/0258632 A1* | 9/2015 | Pluess | B23K 26/38 219/121.72 |
| 2017/0217818 A1* | 8/2017 | Dumenil | C03B 33/0235 |
| 2017/0225271 A1* | 8/2017 | Goodman | B23K 26/402 |
| 2017/0266758 A1* | 9/2017 | Fukui | B23K 26/042 |
| 2018/0215649 A1* | 8/2018 | Wada | B23K 26/60 |

FOREIGN PATENT DOCUMENTS

| | | | | |
|---|---|---|---|---|
| DE | 10 2015 210 030 A1 | 12/2015 | | |
| DE | 10 2014 109 792 A1 | 1/2016 | | |
| DE | 10 2018 100 443 A1 | 7/2019 | | |
| EP | 2 781 296 A1 | 9/2014 | | |
| EP | 3 366 656 A1 | 8/2018 | | |
| EP | 3 560 896 A1 | 10/2019 | | |
| JP | 10291084 A * | 11/1998 | | C03B 33/037 |
| JP | 2004155159 A * | 6/2004 | | C03B 33/093 |
| JP | 2006131443 A * | 5/2006 | | |
| JP | 2015010019 A * | 1/2015 | | |
| JP | 2015174127 A * | 10/2015 | | B23K 20/10 |
| JP | 2016-216281 A | 12/2016 | | |
| JP | 2017-077991 A | 4/2017 | | |
| JP | 2018-505840 A | 3/2018 | | |
| KR | 10-2006-0081246 A | 7/2006 | | |
| KR | 101344365 B1 * | 12/2013 | | |
| KR | 10-1431217 B1 | 8/2014 | | |
| KR | 10-2015-0110707 A | 10/2015 | | |
| KR | 10-2015-0118312 A | 10/2015 | | |
| WO | WO 2008/017323 A1 | 2/2008 | | |
| WO | WO 2014/121261 A1 | 8/2014 | | |

OTHER PUBLICATIONS

Machine translation of JP-2004155159-A, Oct. 2023 (Year: 2023).*
Machine translation of JP-2006131443-A, Oct. 2023 (Year: 2023).*
Machine translation of KR-101344365-A, Oct. 2023 (Year: 2023).*
Machine translation of JP-2015010019-A, Oct. 2023 (Year: 2023).*
Machine translation of JP-2015174127-A, Oct. 2023 (Year: 2023).*
International Search Report and Written Opinion mailed Mar. 30, 2020 in International Application No. PCT/KR2019/017425, in 10 pages. (*English translation of ISR in 2 pages.*)
First Office Action dated Jun. 6, 2022 in Chinese Patent Application No. 201980054240.0 in 11 pages.
Second Office Action dated Nov. 14, 2022 in Chinese Patent Application No. 201980054240.0 in 8 pages.
Rejection Decision dated May 27, 2023 in Chinese Patent Application No. 201980054240.0 in 6 pages.
Office Action dated Mar. 29, 2022 in German Patent Application No. 11 2019 006 190.9 in 7 pages.
First Office Action dated Apr. 19, 2022 in Japanese Patent Application No. 2021-510024 in 7 pages.
Second Office Action dated Oct. 25, 2022 in Japanese Patent Application No. 2021-510024 in 3 pages.
Notice of Allowance dated Apr. 4, 2023 in Japanese Patent Application No. 2021-510024 in 3 pages.

* cited by examiner

METHOD AND DEVICE FOR CUTTING STRUCTURE COMPOSED OF BRITTLE MATERIAL

CROSS-REFERENCE TO RELATED APPLICATIONS

This application is a national phase of PCT Application No. PCT/KR2019/017425, filed on Dec. 11, 2019, which claims priority to Korean Patent Application No. 10-2018-0161181 filed on Dec. 13, 2018, each of which is hereby incorporated by reference.

TECHNICAL FIELD

One or more embodiments of the present disclosure relate to a method and apparatus for cutting a structure (hereinafter, referred to as a brittle body) including a brittle material.

BACKGROUND ART

Methods of cutting a brittle body mainly include a laser processing method and a mechanical processing method, and such above methods are used in various ways according to a type of a material. A laser processing method is a non-contact method generating less dust as compared with a mechanical processing method, and is used to increase a strength against external impact by improving quality of a cut surface. In addition, carbon dioxide laser ($CO_2$ laser), ultraviolet laser (UV laser), infrared ray laser (IR laser), etc. may be used as a laser source. In addition, in a mechanical processing method, a physical crack is formed in a surface of a brittle material by using a diamond tip or a wheel, which is a traditional glass cutting method, and then a breaking operation is performed by using a bar, a roller, a bending method, etc.

However, the above method of cutting the brittle body is applied to a plate-type brittle body, and a brittle body may not adopt the cutting method applied to the plate-type brittle body, due to characteristics thereof.

DESCRIPTION OF DISCLOSURE

Technical Problem to be Solved

One or more embodiments of the present invention provide a method and apparatus for cutting a brittle body having a high-quality cut surface without performing an additional polishing process.

Solution to Problem

According to an embodiment of the present disclosure, there is provided a method of cutting a brittle body, the method including preparing a brittle body having a rotary shaft, forming a scribing line by irradiating laser on the brittle body along a preset route by using a laser irradiation unit, and cutting the brittle body by contacting a vibration unit that vibrates at a preset frequency to a first region of the brittle body, which is spaced apart from the scribing line.

According to the embodiment of the present disclosure, the forming of the scribing line may include rotating the brittle body about the rotary shaft, and irradiating the laser to the rotating brittle body, such that a focal position of the laser is moved from a center of the brittle body to an outer side portion of the brittle body.

According to the embodiment of the present disclosure, the forming of the scribing line may include irradiating the laser while moving the laser irradiation unit in a first direction from the center of the brittle body to the outer side portion of the brittle body.

According to the embodiment of the present disclosure, the forming of the scribing line may include irradiating the laser while moving the laser irradiation unit in the first direction, and while reciprocating the laser irradiation unit in a second direction that is perpendicular to the first direction.

According to the embodiment of the present disclosure, the cutting of the brittle body may further include pressing the brittle body by using the vibration unit.

According to the embodiment of the present disclosure, a direction in which the brittle body is pressed by the vibration unit may be opposite to a direction in which the laser is irradiated.

According to the embodiment of the present disclosure, the direction in which the laser is irradiated may intersect with the rotary shaft of the brittle body.

According to the embodiment of the present disclosure, the brittle body may include a circular brittle body, and the laser irradiation unit may maintain a constant distance from the rotary shaft during one complete rotation of the circular brittle body.

According to the embodiment of the present disclosure, the brittle body may include a polygonal brittle body, and a distance from the rotary shaft to the laser irradiation unit may periodically change during one complete rotation of the polygonal brittle body.

According to another embodiment of the present disclosure, there is provided a brittle body including a cut surface cut by the method, wherein the cut surface is a laser-processed surface.

According to the embodiment of the present disclosure, a processing pattern of the cut surface may be non-oriented.

According to another embodiment of the present disclosure, there is provided a brittle body cutting apparatus including a rotation unit for rotating a brittle body having a rotary shaft, a laser irradiation unit forming a scribing line by irradiating laser onto the brittle body along a preset path, and a vibration unit for transferring vibration energy to the brittle body by contacting a first region of the brittle body, which is spaced apart from the scribing line, while vibrating at a preset frequency.

According to the embodiment of the present disclosure, the brittle body cutting apparatus may further include an align camera for identifying a position of the brittle body in order to irradiate laser.

According to the embodiment of the present disclosure, the laser irradiation unit may irradiate the laser onto the brittle body that is rotated by the rotation unit, such that a focal position of the laser is moved from a center of the brittle body to an outer side portion of the brittle body.

According to the embodiment of the present disclosure, the vibration unit may further include a unit for pressing the brittle body in a direction opposite to the first direction in which the focal position of the laser is moved.

According to the embodiment of the present disclosure, the vibration unit may include a tip of a ball type or a roller type.

Other aspects, features and advantages of the disclosure will become better understood through the accompanying drawings, the claims and the detailed description.

Advantageous Effects of the Disclosure

In a method of cutting a brittle body according to one or more embodiments of the present invention, a cutting operation is performed by combining laser and a vibrator such that an object to be processed having a specific type of shape, e.g., a brittle body, may be easily cut.

MODE OF DISCLOSURE

Figure 1:
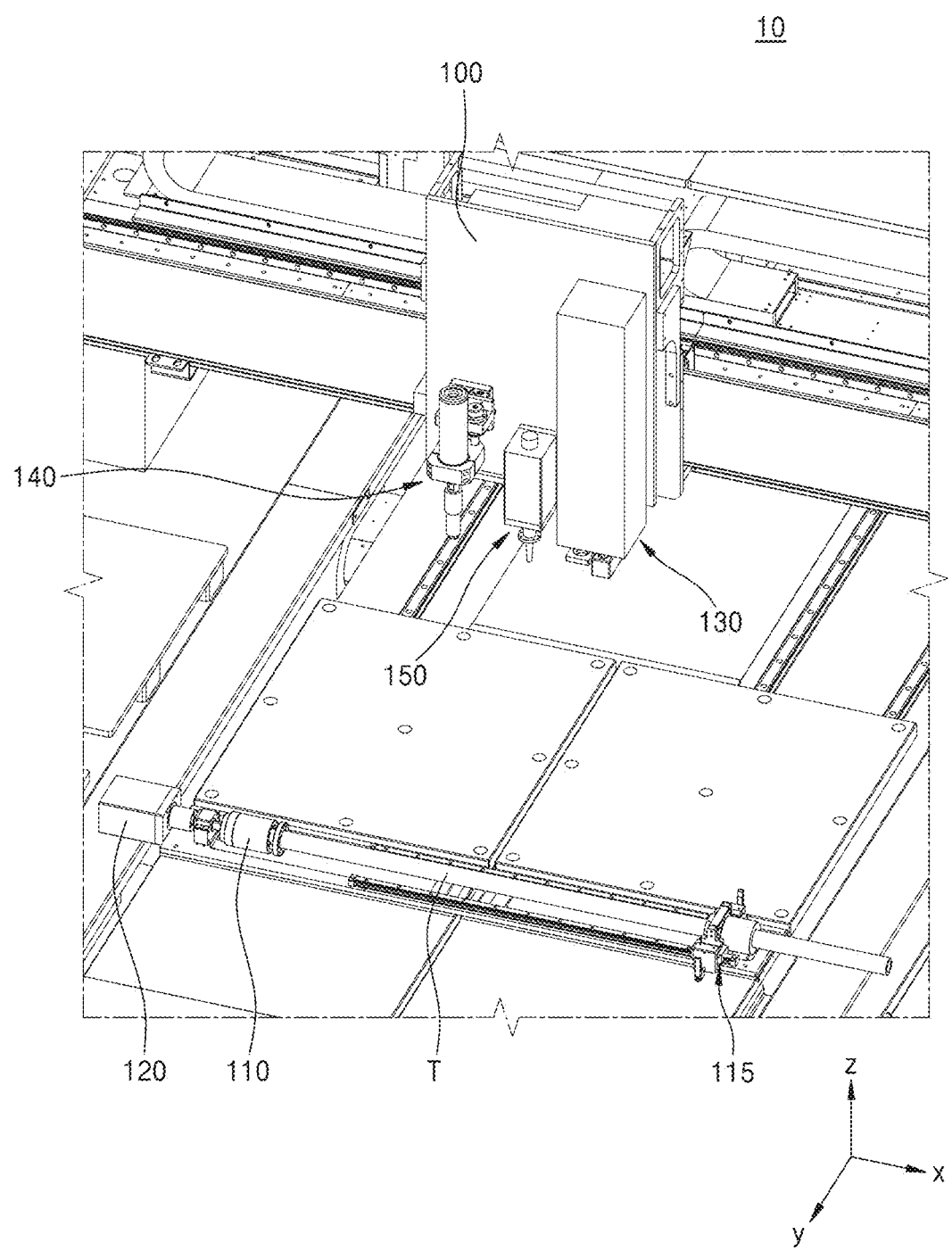
FIG. 1 is a perspective view of a brittle body cutting apparatus according to an embodiment of the present disclosure.

The example embodiments will be described below in more detail with reference to the accompanying drawings. Those components that are the same or are in correspondence are rendered the same reference numeral regardless of the figure number, and redundant explanations are omitted.

As the present disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including," "having," and "comprising" are intended to indicate the existence of the features or components disclosed in the specification, and are not intended to preclude the possibility that one or more other features or components may exist or may be added.

It will be understood that when a unit, region, or component is referred to as being "formed on" another layer, region, or component, it can be directly or indirectly formed on the other layer, region, or component. That is, for example, intervening units, regions, or components may be present.

It will be understood that when an element is referred to as being "connected" or "coupled" to another element, it can be directly connected or coupled to the other element or intervening elements may be present.

It will be further understood that the terms "comprises," "comprising," "includes" and/or "including," when used herein, specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

Figure 2:
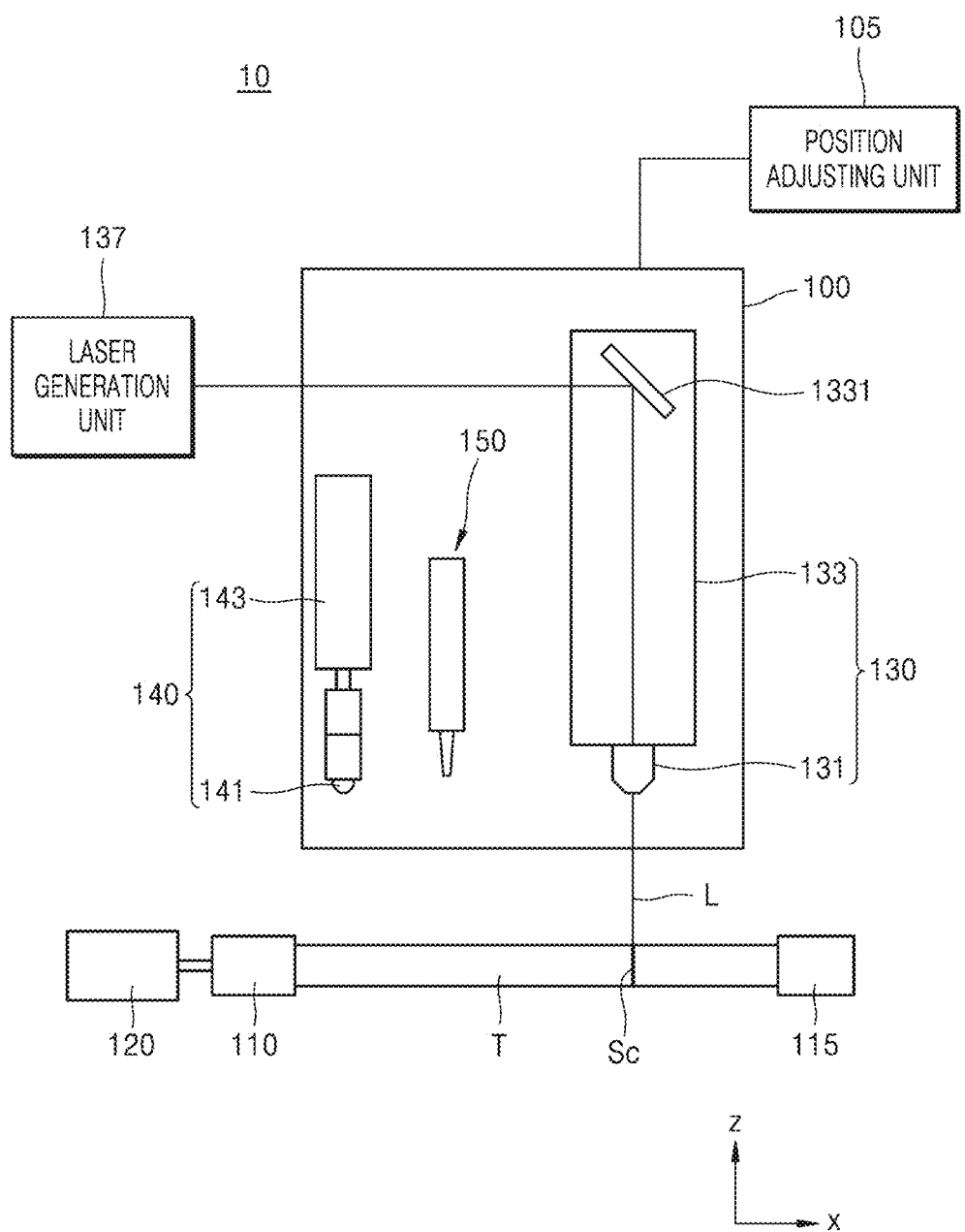
FIG. 2 is a conceptual diagram schematically showing the brittle body cutting apparatus of FIG. 1.

FIG. 1 is a perspective view of a brittle body cutting apparatus 10 according to an embodiment of the disclosure, and FIG. 2 is a conceptual diagram schematically showing the brittle body cutting apparatus 10 of FIG. 1.

Referring to FIGS. 1 and 2, the brittle body cutting apparatus 10 according to the embodiment of the disclosure may include a fixing unit 110, a laser irradiation unit 130, a vibration unit 140, and a rotation unit 120.

In the present specification, a brittle body T denotes a cutting target including a rotary shaft. In an embodiment, the brittle body T may be a tubular brittle body including a cavity TO (see FIG. 4), an inner surface A1 surrounding the cavity TO, and an outer surface A2 located outside the inner surface A1. The brittle body T may include a brittle material including a glass material such as quartz, soda lime, and borosilicate, but a technical scope of the present disclosure is not limited thereto. That is, the brittle body may be applied to a cutting target that may be cut by using laser and a vibrator. The brittle body T may have a circular cross-section or a polygonal cross-section such as a triangular or a quadrangular shape, but is not limited thereto. That is, any type of cutting target that may be rotated by the rotation unit 120 that will be described later may be included.

The fixing unit 110 fixes an end of the brittle body T, and may include, for example, a chuck member that surrounds and fixes an outer surface of one end of the brittle body T. The fixing unit 110 may be provided as one body for fixing at least one end of the brittle body T, and fixes the end of the brittle body T not to be shaken while the vibration unit 140 is pressed onto an outer surface of the brittle body T, which is spaced apart from a scribing line Sc that will be described later. In another embodiment, as shown in the drawings, the fixing unit 110 may further include at least one auxiliary fixing unit 115 that fixes an opposite end that is opposite to the end of the brittle body T or a region spaced apart from the end of the brittle body T. As such, the fixing unit 110 may stably fix the brittle body T without regard to a length of the brittle body, and may prevent an unintentional falling of a cut portion T' (see FIG. 6) cut from a main body portion of the brittle body T. In other words, even when the brittle body is cut, the fixing unit 110 and the auxiliary fixing unit 115 stably fix the brittle body and prevent the brittle body from falling.

In addition, the brittle body cutting apparatus 10 irradiates laser along a circumference of the brittle body T in order to form the scribing line Sc on the brittle body T in a route preset. Here, the brittle body T is fixed, the laser irradiation unit 130 that will be described later rotates about the brittle body T to form the scribing line Sc. However, for easiness in implementation, a case in which the scribing line Sc is formed by irradiating the laser from the laser irradiation unit that is fixed while rotating the brittle body T will be described hereinafter.

The brittle body cutting apparatus 10 may further include the rotation unit 120 that is connected to the fixing unit 110, in order to rotate the brittle body T. The rotation unit 120 may be a driving unit such as a motor or an actuator, and the brittle body T may be rotated by rotating the fixing unit 110 connected thereto. Here, the rotation unit 120 may rotate the brittle body T at a constant speed.

The laser irradiation unit 130 irradiates laser to the brittle body T along the route preset, and then forms the scribing line Sc. The laser irradiation unit 130 may irradiate the laser to the brittle body in a Bessel beam processing method or a filamentation processing method. In other words, the laser irradiation unit 130 may form a laser beam in the form of a Bessel beam through a filamentation processing method and then may irradiate the laser beam to the brittle body T.

Here, the filamentation processing method is a processing method using a filamentation phenomenon, and the filamentation phenomenon denotes a phenomenon in which plasma of a few to tens of Rayleigh lengths or greater is generated under a certain condition when femtosecond laser is focused in glass. In other words, in order for a focused laser pulse to be self-focused in a material having a Kerr effect such as transparent glass, a pulse of a threshold value or greater has to be irradiated. Plasma dispersion occurs after the self-focusing, and the beam that is more focused due to the self-focusing is large enough to locally exceed a damage threshold, but a pulse width is not long enough to generate avalanche ionization. Thus, ionization occurs, but does not permanently damage the material. When such above self-focusing and the plasma dispersion successively occur in a balanced manner, continuous refractive index change occurs over a few Rayleigh lengths, which is called as the filamentation phenomenon. According to the present disclosure, processing quality of a cut surface in the brittle body T may be improved by using the filamentation processing method. However, the technical gist of the present disclosure is not limited thereto.

The laser irradiation unit 130 may directly generate laser and irradiate the laser to the brittle body T, but in another embodiment, the laser irradiation unit 130 may receive laser L generated by a laser generation unit 137 located outside and may transfer the laser L to the brittle body T as shown in FIG. 2. To this end, the laser irradiation unit 130 may include an optical unit 133 and a light irradiation unit 131 that may convert the laser L provided from the laser generation unit 137 in the form of a Bessel beam and may guide the converted laser to the brittle body T. In the drawings, only a mirror 1331 that reflects the laser L and changes a path of the laser L is shown as the optical unit 133, but the optical unit 133 is not limited thereto. That is, the optical unit 133 may include a plurality of mirrors or a plurality of lenses for changing the path of the laser L.

In addition, the laser irradiation unit 130 irradiates the laser L onto the brittle body T that is rotated by the rotation unit 120, and the laser L may be irradiated such that a focal position of the laser L may be moved from the inner surface A1 to the outer surface A2 of the brittle body T. When the laser irradiation unit 130 irradiates the laser L making a focal position on the outer surface A2 first, the processed portion is on a path of the laser, and thus, it may be difficult to focus the laser at an accurate focal position because the laser is dispersed by the processed portion. Therefore, the laser irradiation unit 130 of the present disclosure irradiates the laser L such that the focal position of the laser L moves from the inner surface A1 to the outer surface A2 of the brittle body T. In other words, the laser irradiation unit 130 may irradiate the laser L while moving the focal position of the laser L in a first direction (z-direction) intersecting with a lengthwise direction (x-direction) of the brittle body T, in more detail, the first direction (z-direction) that is perpendicular to the lengthwise direction (x-direction).

In particular, the laser irradiation unit 130 may irradiate the laser L while moving the focal position of the laser L from the inner surface A1 to the outer surface A2 of the brittle body T. Here, the brittle body cutting apparatus 10 includes a position adjusting unit 105 that adjusts the position of the laser irradiation unit 130, and may move the focal position of the laser L according to a location of the laser irradiation unit 130. The position adjusting unit 105 may include a first direction moving unit that moves the laser irradiation unit 130 at least in the first direction (z-direction). Also, the position adjusting unit 105 may further include a second direction moving unit and a third direction moving unit that move the laser irradiation unit 130 in an arc direction and a y-direction perpendicular to the first direction (z-direction), and thus, the position of the laser irradiation unit 130 may be controlled in a three-axis direction and the cutting target may be cut in various shapes.

In addition, the vibration unit 140 may transfer vibration energy to the brittle body T by contacting a first region of the brittle body T, which is spaced apart from the scribing line Sc, while vibrating at a preset frequency. The vibration unit 140 may include a vibration generator 143 for generating vibration energy and a vibration tip unit 141 that provides the brittle body T with the vibration energy generated by the vibration generator 143 by directly contacting the brittle body T.

The vibration unit 140 may be in contact with the brittle body T both in a stopped state and in a rotating state. When the brittle body T is in the stopped state, the vibration unit 140 may be in line-contact with or surface-contact with the brittle body T, and when the brittle body T is in the rotating state, the vibration unit 140 may be in line-contact with or point-contact with the brittle body T. In other words, when a tip of the vibration unit 140 is a ball type, the vibration unit 140 may be in the point-contact with the brittle body T both in the stopped state and the rotating state of the brittle body T. Alternatively, when the tip of the vibration unit 140 is a roller type, the vibration unit 140 may be in line-contact with brittle body T both in the stopped state and the rotation state of the brittle body T. In another embodiment, when the tip of the vibration unit 140 is of a cylinder type corresponding to a curved surface of the brittle body, the vibration unit 140 may be in surface-contact with the brittle body T. As the contact type of the vibration tip portion varies depending on the stopped state or the rotating state, the cutting target may be effectively cut. In an embodiment, the vibration unit 140 may use ultrasonic oscillation and may use a magnetostrictive type, a piezoelectric/electrodistortion type, and an electronic type vibrator according to a sound source. Also, a resonant frequency may range from 20 kHz to 400 kHz.

In addition, the vibration unit 140 may press the brittle body T. Here, the vibration unit 140 may press the brittle body T in any direction in which the brittle body T may be pressed. In an embodiment, the vibration unit 140 may press the brittle body T in an opposite direction (−z direction) to the first direction (+z direction) in which the focal position of the laser moves. In other words, the vibration unit 140 may allow the brittle body T to be easily cut by applying pressure onto the brittle body T with the vibration.

Here, the vibration tip portion 141 may have a curved surface, and in particular, the vibration tip portion 141 may be of a ball type or a roller type so as to be in contact with the brittle body T even in a state in which the brittle body T is rotating. Also, the vibration tip portion 141 has a material having a lower hardness than that of the brittle body T so as to evenly generate vibration on the outer surface A2 of the brittle body T, and thus, generation of scratches on the outer surface A2 may be minimized while implementing a breaking.

In addition, the brittle body cutting apparatus 10 according to an embodiment of the present disclosure may further include an align camera 150 that identifies a location of the brittle body T in order to irradiate laser. Here, the brittle body cutting apparatus 10 may respectively control the positions of the align camera 150, the laser irradiation unit 130, and the vibration unit 140 described above. In another embodiment, as shown in the drawings, the brittle body cutting apparatus 10 may control the positions of the above components at once by connecting the vibration unit 140, the align camera 150, and the laser irradiation unit 130 via one plate 100 and controlling the position of the plate 100 by using the position adjusting unit 105.

Hereinafter, a method of cutting the brittle body T by using the brittle body cutting apparatus 10 will be described in detail below with reference to FIGS. 3 to 11.

Figure 3:
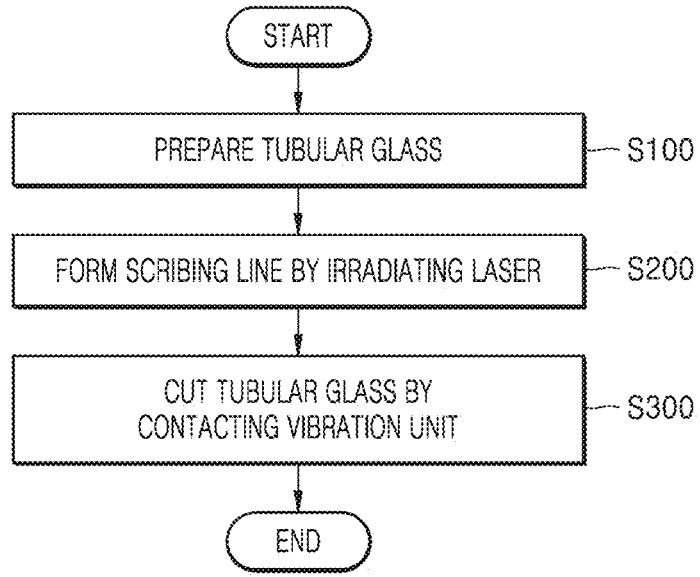
FIG. 3 is a flowchart sequentially describing a method of cutting a brittle body according to an embodiment of the present disclosure.

FIG. 3 is a flowchart for sequentially describing a method of cutting the brittle body, according to an embodiment of the present disclosure, and FIGS. 4 to 8 are diagrams for describing processes of cutting the brittle body T according to the method of cutting the brittle body as shown in FIG. 3.

Figure 4:
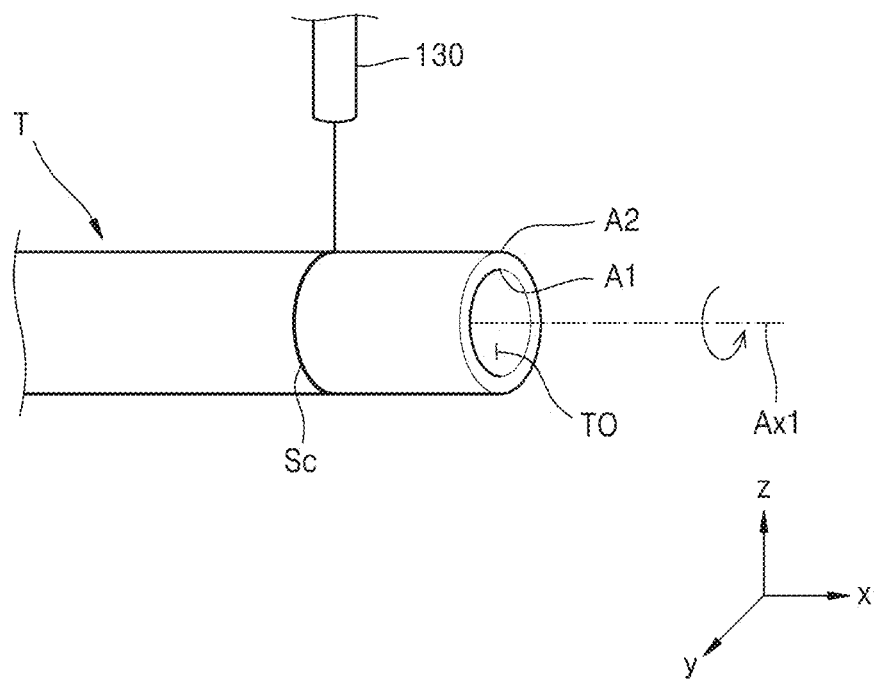
FIGS. 4 to 6 are diagrams for describing processes of cutting a brittle body by the method of cutting the brittle body shown in FIG. 3.

Referring to FIGS. 3 and 4, according to the method of cutting the brittle body, the brittle body T is prepared (S100). As described above, the brittle body T denotes a cutting target of a tubular shape including the cavity TO, the inner surface A1 surrounding the cavity TO, and the outer surface A2 located outside the inner surface A1 The brittle body T may have a circular cross-section, or a polygonal cross-section such as a triangular cross-section and a quadrangular cross-section. The brittle body T may be prepared in a state of being fixed by the fixing unit 110.

After that, according to the method of cutting the brittle body, laser L is irradiated by the laser irradiation unit 130 onto the brittle body T along a route that is preset to form the scribing line Sc (S200). The scribing line Sc may be a dosed curve formed along a circumference of the brittle body T. In other words, the process of forming the scribing line Sc on the brittle body T may include irradiating the laser L onto the rotating brittle body T while rotating the brittle body T about a rotary shaft Ax1 passing through the cavity TO.

Here, the process of forming the scribing line Sc may include irradiating the laser L so that a focal position of the laser L may be moved from the inner surface A1 to the outer surface A2 of the brittle body T. When the scribing line Sc is formed, in an embodiment, the method of cutting the brittle body may include irradiating the laser while moving the laser irradiation unit 130 in a first direction (+z direction) from the inner surface A1 to the outer surface A2 of the brittle body T. In another embodiment, in a state in which the laser irradiation unit 130 is fixed, the laser may be irradiated while moving the brittle body T in a −z direction.

In an alternative embodiment, the process of forming the scribing line Sc may include irradiating the laser L while moving the laser irradiation unit 130 in the first direction (z-direction), and in particular, the laser L may be irradiated while reciprocating the laser irradiation unit 130 in a second direction (y-direction) perpendicular to the first direction (z-direction). In other words, the laser irradiation unit 130 may move in a direction away from the brittle body T along the z-axis while reciprocating in the y direction that is a diameter direction of the brittle body T.

In addition, the laser irradiation unit 130 may irradiate the laser while moving in a third direction (x-direction) that intersects with both the first direction (z-direction) and the second direction (y-direction). As described above, the method of cutting the brittle body may process the brittle body to have various shapes of cut surfaces by controlling the position of the laser irradiation unit 130.

Figure 5:
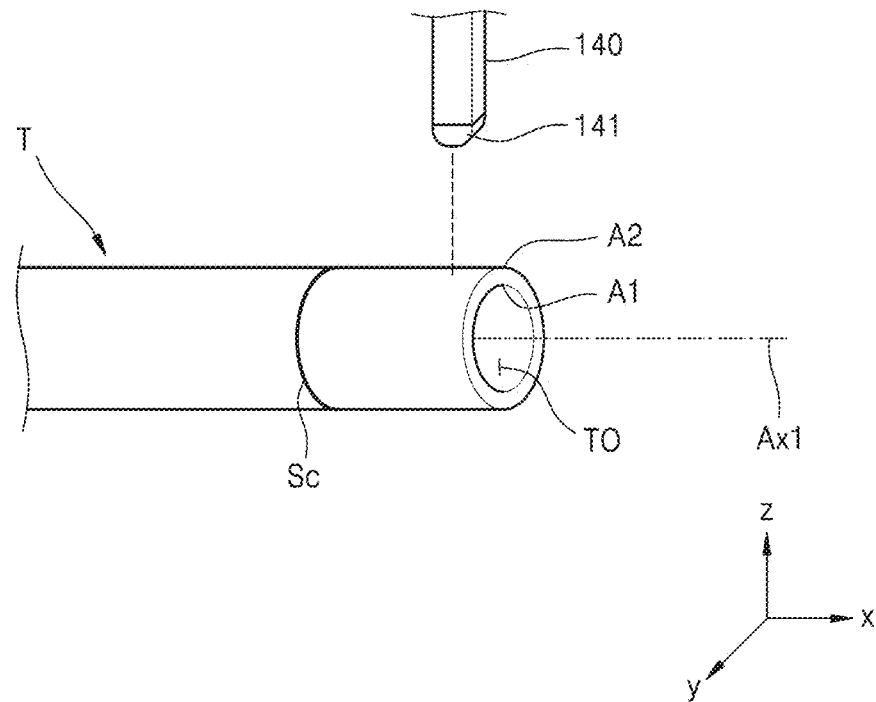
Figure 6:
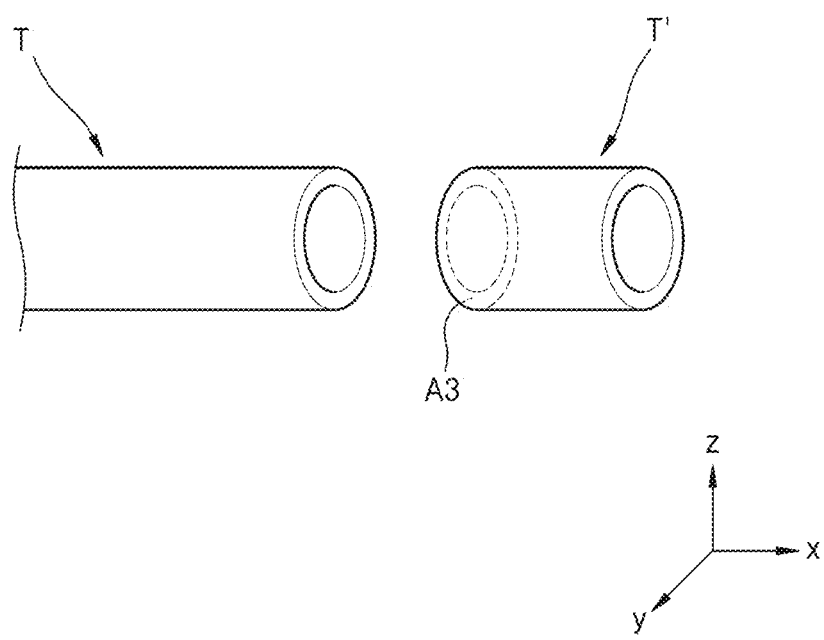

After that, referring to FIGS. 3, 5, and 6, the method of cutting the brittle body includes cutting the brittle body T by contacting the vibration unit 140 that vibrates at a preset frequency to a first region of the brittle body, which is spaced apart from the scribing line Sc (S300), Here, during the process of cutting the brittle body T, the brittle body T may be pressed by using the vibration unit 140, and a pressing direction of the vibration unit 140 may be opposite (−z direction) to the first direction (+z direction).

The vibration unit 140 may contact the brittle body T to transfer vibration energy to the scribing line Sc and implement braking, while vibrating at the preset frequency. The vibration unit 140 may contact the brittle body T both in a stopped state or a rotating state, and when the brittle body T is in the stopped state, the vibration unit 140 may be in point-contact with, line-contact with, or surface-contact with the brittle body T according to a tip shape of the vibration unit 140, and when the brittle body T is in the rotating state, the vibration unit 140 may be in line-contact with or surface-contact with the brittle body T.

A cut portion T that is cut through the above-described processes include a cut surface A3 as shown in FIG. 6. That is, the cut surface A3 includes a laser processed surface obtained through laser irradiation. Since the cut surface is processed in a non-contact manner by using the laser, not by a physical processing method such as a mechanical cutting, generation of chips or burr, as well as particles, may be minimized, and thus, high quality cut surface may be obtained.

Also, according to the above-described method of cutting the brittle body, a polishing process for removing the chips or burr may be omitted, and thus, a processing efficiency may be improved. Here, the brittle body T manufactured through the above processes is formed only by the laser process, without performing the polishing process, and thus, a processing pattern thereof may be non-oriented.

Figure 7:
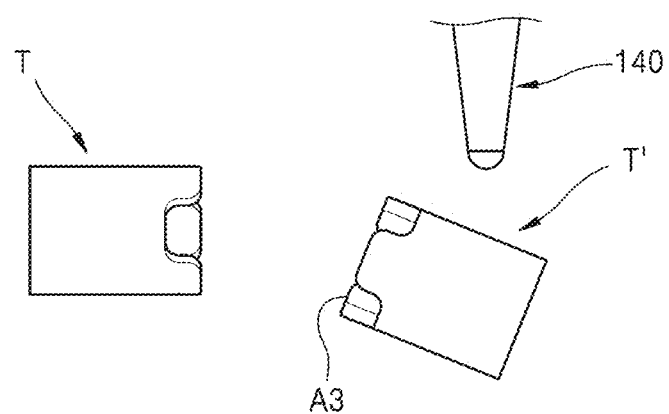
FIG. 7 is a diagram showing a cut portion that is release-treated by using a brittle body cutting method according to an embodiment.

FIG. 7 is a diagram for describing the cut portion T' that is release-treated by the method of cutting the brittle body according to an embodiment of the present disclosure.

Referring to FIG. 7, according to the method of cutting the brittle body, the scribing line Sc may be formed by moving the laser irradiation unit 130 in three-axis directions, e.g., x-direction, y-direction, and z-direction, and thus, the release-treatment may be performed as shown in the drawing. Therefore, the cut surface A3 of the cut brittle body T' may have a curved surface having a curvature. According to the method of cutting the brittle body, the laser may be irradiated by synchronizing a rotating speed of the brittle body T with a moving velocity of the laser irradiation unit 130 in the x-direction (lengthwise direction of the brittle body) while rotating the brittle body T at a constant speed.

Figure 8:
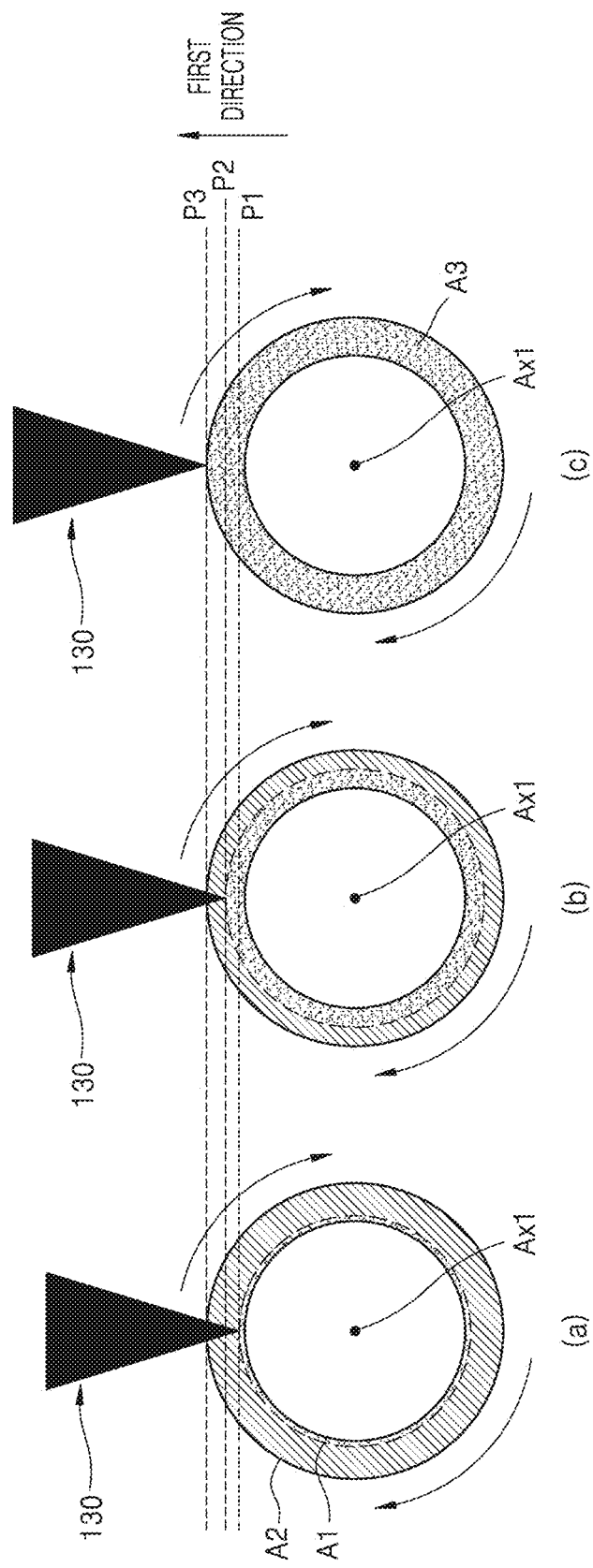
FIG. 8 is a cross-sectional view for describing the method of cutting the brittle body of FIG. 3.
Figure 9:
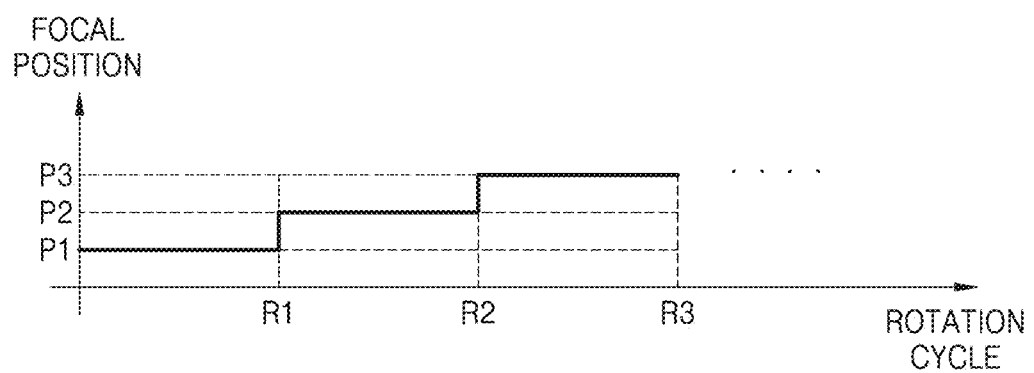
FIG. 9 is a diagram for describing a positional relationship of a laser irradiation unit according to a rotation cycle in the method of cutting the brittle body shown in FIG. 8.

FIG. 8 is cross-sectional views for describing the method of cutting the brittle body of FIG. 3, and FIG. 9 is a diagram for describing a positional relationship of the laser irradiation unit according to a rotation cycle in the method of cutting the brittle body of FIG. 8.

Referring to (a) to (c) in FIG. 8, according to the method of cutting the brittle body according to an embodiment of the present disclosure, the laser is irradiated while moving the focal position of the laser from the inner surface A1 to the outer surface A2 of the brittle body T. However, the scribing line Sc has to form a closed path or a closed curve.

In an embodiment, when the brittle body T is a circular brittle body, the focal position of the laser has to be fixed at a constant location while the brittle body T rotates once. In other words, during one complete rotation of the brittle body T, the laser irradiation unit 130 has to maintain a constant distance from the rotary shaft Ax1. After that, when one rotation of the brittle body T is finished, the location of the laser irradiation unit 130 may be moved in the first direction away from the brittle body T.

Referring to FIG. 9, during a first one-complete-rotation R1 of the brittle body T, the focal position of the laser irradiation unit 130 is constant at a first position P1 (see (a) of FIG. 8), during a second one-complete-rotation R2, the focal position may be constantly maintained at a second position P2 (see (b) of FIG. 8) that is farther from the rotary shaft Ax1 than the first position P1, The above sequence is finished when the laser irradiation from the inner surface A1 to the outer surface A2 of the brittle body T is completed.

Figure 10:
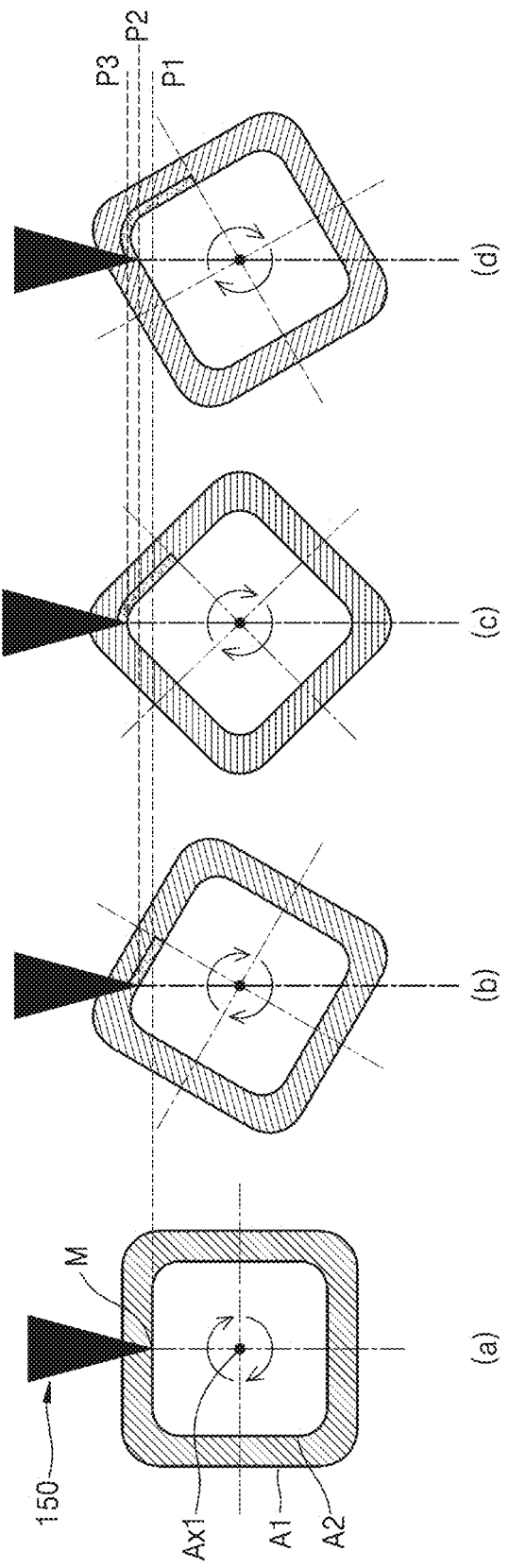
FIG. 10 is a diagram for describing a process of cutting a polygonal brittle body by using the brittle body cutting method of FIG. 3.
Figure 11:
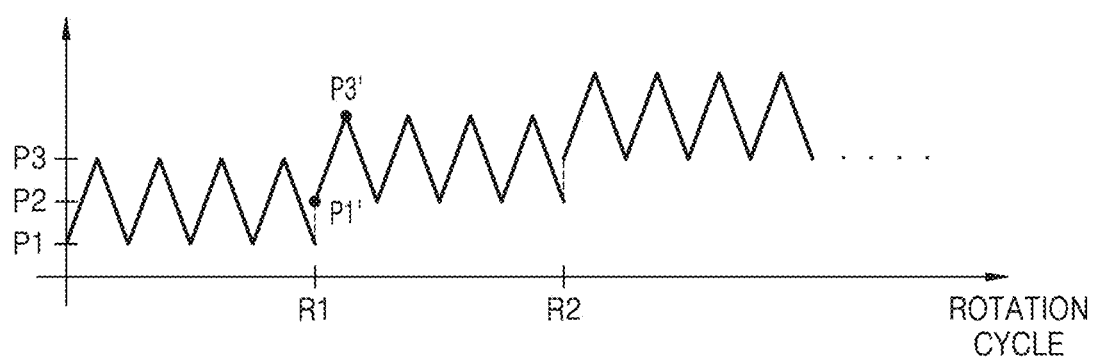
FIG. 11 is a diagram for describing a positional relationship of a laser irradiation unit according to a rotation cycle in the method of cutting the brittle body shown in FIG. 10.

FIG. 10 is diagrams for describing a process of cutting a polygonal brittle body by using the method of cutting the brittle body of FIG. 3, and FIG. 11 is a diagram for describing a positional relationship of the laser irradiation unit according to a rotation cycle in the method of cutting the brittle body of FIG. 10.

Referring to (a) to (d) of FIG. 10, the method of cutting the brittle body according to another embodiment of the present disclosure may be applied to a case in which the brittle body T has a polygonal shape. Like in the circular brittle body, according to the method of cutting the brittle body, the laser is irradiated onto the polygonal brittle body T while rotating the brittle body T to form a closed path or a closed curve, that is, the scribing line Sc.

In an embodiment, as shown in the drawings, when the brittle body T is a quadrangular brittle body, the focal position of the laser has to be periodically moved in order to irradiate the laser on surfaces at the same distance from the rotary shaft Ax1 while the brittle body T rotates once. In other words, when the laser irradiation starts from a center M in one side of a quadrangle based on a cross-section, the focal position of the laser may be at the first position P1, and the focal position of the laser may be away from the rotary shaft Ax1 toward an apex as the brittle body T rotates (P1→P3). Continuously, when the brittle body T rotates, the focal position of the laser is repeatedly close to and away from the rotary shaft Ax1, periodically.

Referring to FIG. 11, during a first one-complete-rotation R1 of the brittle body T, the focal position of the laser irradiation unit 130 is periodically moved between the first position P1 and the third position P3. After that, during a second one-complete-rotation R2 of the brittle body T, the focal position of the laser irradiation unit 130 moves in the first direction (z direction), and then, moves periodically between a 1-1 position P1' and a 1-3 position P3'. The above sequence is finished when the irradiation of the laser from the inner surface A1 to the outer surface A2 of the brittle body T is completed.

As described above, in the method of cutting the brittle body according to one or more embodiments of the present disclosure, the cutting operation is performed by combining the laser and the vibrator, and thus, the processing target having a specific type of material, e.g., the brittle body, may be easily cut. Also, according to the method of cutting the brittle body in one or more embodiments of the present disclosure, a separate braking unit is not necessary, the braking process may be performed on the same line as that of the scribing process, and thus, configuration of equipment may be minimized. Also, according to the method of cutting the brittle body, a short processing target that is difficult to be braking processed, as well as reinforced glass that has been impossible to be processed by a physical wheel, may be processed. Also, because the processing target is cut by using the laser and the vibrator, an additional polishing process for removing chips or burr may be omitted, and thus, the processing efficiency may be improved.

The above-described embodiments are provided in an example, in which the processing target has a tubular shape having a cavity, but the present disclosure is not limited thereto. That is, the technical concept of the present disclosure may be applied to a case in which the processing target has a rotary shaft.

While the disclosure has been particularly shown and described with reference to example embodiments thereof, it will be understood by those of ordinary skill in the art that various changes in form and details may be made therein without departing from the spirit and scope as defined by the following claims. Therefore, the scope sought to be protected of the disclosure shall be defined by the appended claims.

What is claimed is:

1. A method of cutting a brittle body, the method comprising:
    preparing a brittle body having a rotary shaft;
    forming a scribing line by irradiating a laser beam on the brittle body along a preset route by using a laser irradiation unit; and
    cutting the brittle body by bringing a vibration unit that vibrates at a preset frequency in contact with a first region of the brittle body, which is spaced apart from the scribing line,
    wherein the forming of the scribing line comprises:
    rotating the brittle body about the rotary shaft; and
    irradiating the laser beam to the brittle body being rotated, such that a focal position of the laser beam is moved from a center of the brittle body to an outer side portion of the brittle body.

2. The method of claim 1, wherein the laser irradiator is configured to irradiate the laser beam while moving the focal position of the laser beam in a first direction intersecting with a lengthwise direction of the brittle body.

3. The method of claim 1, wherein the forming of the scribing line includes irradiating the laser beam while moving the laser irradiation unit in a first direction from the center of the brittle body to the outer side portion of the brittle body.

4. The method of claim 3, wherein the forming of the scribing line includes irradiating the laser beam while moving the laser irradiation unit in the first direction, and while reciprocating the laser irradiation unit in a second direction that is perpendicular to the first direction.

5. The method of claim 1, wherein the cutting of the brittle body further comprises pressing the brittle body by using the vibration unit.

6. The method of claim 5, wherein a direction in which the brittle body is pressed by the vibration unit is opposite to a direction in which the laser beam is irradiated.

7. The method of claim 1, wherein the laser beam is irradiated in a first direction that intersects the rotary shaft of the brittle body.

8. The method of claim 1, wherein the brittle body includes a circular brittle body, and the laser irradiation unit maintains a constant distance from the rotary shaft during one complete rotation of the circular brittle body.

9. The method of claim 1, wherein the brittle body includes a polygonal brittle body, and a distance from the rotary shaft to the laser irradiation unit periodically changes during one complete rotation of the polygonal brittle body.

10. A brittle body cutting apparatus comprising:
- a rotator configured to rotate a brittle body having a rotary shaft;
- a laser irradiator configured to form a scribing line by irradiating a laser beam onto the brittle body along a preset path; and
- a vibrator configured to transfer vibration energy to the brittle body by contacting a first region of the brittle body, which is spaced apart from the scribing line, while vibrating at a preset frequency,
- wherein the laser irradiator is configured to irradiate the laser beam onto the brittle body that is rotated by the rotator, such that a focal position of the laser beam is moved from a center of the brittle body to an outer side portion of the brittle body.

11. The brittle body cutting apparatus of claim 10, further comprising an alignment camera configured to identify a position of the brittle body in order to irradiate a laser beam.

12. The brittle body cutting apparatus of claim 10, wherein the vibrator further comprises a unit configured to press the brittle body in a direction opposite to a first direction in which the focal position of the laser beam is moved.

13. The brittle body cutting apparatus of claim 10, wherein the vibrator includes one of a ball shaped tip or a roller shaped tip.

14. The brittle body cutting apparatus of claim 10, wherein the laser irradiator is configured to irradiate the laser beam while moving the focal position of the laser beam in a first direction intersecting with a lengthwise direction of the brittle body.

* * * * *